United States Patent
Gu et al.

(10) Patent No.: US 9,571,444 B2
(45) Date of Patent: Feb. 14, 2017

(54) BUILDING A PROXIMATE SOCIAL NETWORKING DATABASE BASED ON RELATIVE DISTANCE PROFILING OF TWO OR MORE OPERABLY COUPLED COMPUTERS

(71) Applicant: DewMobile, Inc., Santa Clara, CA (US)

(72) Inventors: Steve X. Gu, Palo Alto, CA (US); Xiaodong Wang, Saratoga, CA (US); Shangpin Chang, San Jose, CA (US)

(73) Assignee: DewMobile, Inc., Santa Clara, CA (US)

(*) Notice: Subject to any disclaimer, the term of this patent is extended or adjusted under 35 U.S.C. 154(b) by 0 days.

(21) Appl. No.: 15/046,385

(22) Filed: Feb. 17, 2016

(65) Prior Publication Data

US 2016/0261546 A1    Sep. 8, 2016

Related U.S. Application Data

(63) Continuation of application No. 14/814,720, filed on Jul. 31, 2015, now Pat. No. 9,270,634.

(60) Provisional application No. 62/126,729, filed on Mar. 2, 2015.

(51) Int. Cl.
  *H04L 12/58* (2006.01)
  *H04W 48/16* (2009.01)
  *H04W 4/02* (2009.01)

(52) U.S. Cl.
  CPC ............. *H04L 51/32* (2013.01); *H04W 4/02* (2013.01); *H04W 48/16* (2013.01)

(58) Field of Classification Search
  None
  See application file for complete search history.

(56) References Cited

U.S. PATENT DOCUMENTS

| | | | |
|---|---|---|---|
| 8,230,461 B1* | 7/2012 | Ledermann | G06F 17/30017 725/133 |
| 8,825,764 B2* | 9/2014 | Nowak | G06Q 50/01 709/204 |
| 2006/0085419 A1* | 4/2006 | Rosen | G06F 17/3087 |
| 2007/0030824 A1 | 2/2007 | Ribaudo et al. | |

(Continued)

FOREIGN PATENT DOCUMENTS

WO    WO2012/159039 A1    12/2012

OTHER PUBLICATIONS

International Searching Authority, "Search Report" in application No. PCT/US2016/018753, dated Apr. 22, 2016, 12 pages.

(Continued)

*Primary Examiner* — Peling Shaw
(74) *Attorney, Agent, or Firm* — Hickman Palermo Becker Bingham LLP

(57) ABSTRACT

Computer systems and methods for generating a social network of users based on the users' devices being operably coupled are discussed herein. Specifically, techniques are described herein to determine the types of relationships between a plurality of users based on telemetry data collected at one or more server computers from the users' operably coupled client devices. The telemetry data describes, among other things, protocol(s) and network interface(s) used to operably couple the client devices, network operations performed by the client devices, and sensory data recorded by the client devices while the devices are operably coupled.

30 Claims, 6 Drawing Sheets

(56) References Cited

U.S. PATENT DOCUMENTS

| | | | |
|---|---|---|---|
| 2008/0086261 A1* | 4/2008 | Robinson | A63F 13/12 |
| | | | 701/532 |
| 2008/0109888 A1* | 5/2008 | Ullah | G06F 21/10 |
| | | | 726/7 |
| 2009/0215469 A1* | 8/2009 | Fisher | H04L 12/588 |
| | | | 455/456.3 |
| 2009/0315776 A1* | 12/2009 | Khosravy | G01S 19/49 |
| | | | 342/452 |
| 2011/0282972 A1* | 11/2011 | Rosen | G06Q 30/02 |
| | | | 709/219 |
| 2012/0047147 A1* | 2/2012 | Redstone | G06F 17/3087 |
| | | | 707/748 |
| 2013/0110949 A1* | 5/2013 | Maurel | G06Q 30/02 |
| | | | 709/206 |
| 2015/0005007 A1* | 1/2015 | Schewel | H04W 4/02 |
| | | | 455/456.3 |

OTHER PUBLICATIONS

Current Claims in application No. PCT/US2016/018753, dated Apr. 2016, 10 pages.

* cited by examiner

BUILDING A PROXIMATE SOCIAL NETWORKING DATABASE BASED ON RELATIVE DISTANCE PROFILING OF TWO OR MORE OPERABLY COUPLED COMPUTERS

CROSS-REFERENCE TO RELATED APPLICATIONS

Benefit Claim

This application is a continuation of application Ser. No. 14/814,720, filed Jul. 31, 2015, which claims the benefit under U.S. Provisional Application No. 62/126,729, filed Mar. 2, 2015, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure generally relates to generating a social network of users based on the users' devices being operably coupled, and more specifically, determining types of relationships between users based on the locations, durations, and/or frequencies over which the users' devices are coupled. SUGGESTED GROUP ART UNIT: 2444, SUGGESTED CLASS/SUBCLASS: 709/206 (SAME AS PARENT NON-PROVISIONAL APPLICATION).

BACKGROUND

Determining the relationship between people can be useful. For example, people that eat at a particular restaurant may have friends with similar tastes. Accordingly, the restaurant's owners may wish to send advertisements to friends of the people that are regular patrons. However, determining the identities and contact information of people that are friends of regular patrons is very difficult. Furthermore, the restaurant's owner may wish to be more selective. For example, instead of sending an advertisement to all the friends of a regular patron, the restaurant owners may want to send an advertisement to just the friends that live or work in the same area as the regular patron.

Collecting contact information is also difficult. Users, such as restaurant patrons, are unlikely to visit a business and provide the contact information of their friends, family, and colleagues. Accordingly, businesses may look to other sources, such as social networking websites, for this data. However, social networking websites are unlikely to have, or allow a business to have access to, the data.

Social networks store data indicating which users are related to each other based on information volunteered by the users. For example, a social networking website may provide an interface to users to specify who their family, friends, classmates, or coworkers are on the social networking website. The social networking website may provide an interface for users to upload the contacts stored on their phones. Those contacts include names, phone numbers, or email addresses, without any data indicating how the contacts are related to any particular user. Accordingly, the social network website may request, through a web or mobile app, how the user is related to one or more of the contacts the user uploaded. Alternatively, a social networking website may determine relationships between users by extracting data from documents. For example, a social networking website may provide an interface for users to submit a resume or curriculum vitae ("CV"). The social networking website can determine where a user has worked by parsing the resume or CV and ask whether the user knows one or more other users that claim to have worked at the same one or more places.

The drawback of the approaches listed above is that users must voluntarily provide personal information about themselves and others to the social networking website. Users are often reluctant to provide that data. Even when users provide some data, some users may hold back data they do not want to be publicly known. However, when users fail to provide their personal information, then the usefulness of the social networking website is limited. Accordingly, even if businesses, or business owners, could have access to the data stored in a social network, the data would be incomplete.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Figure 1:
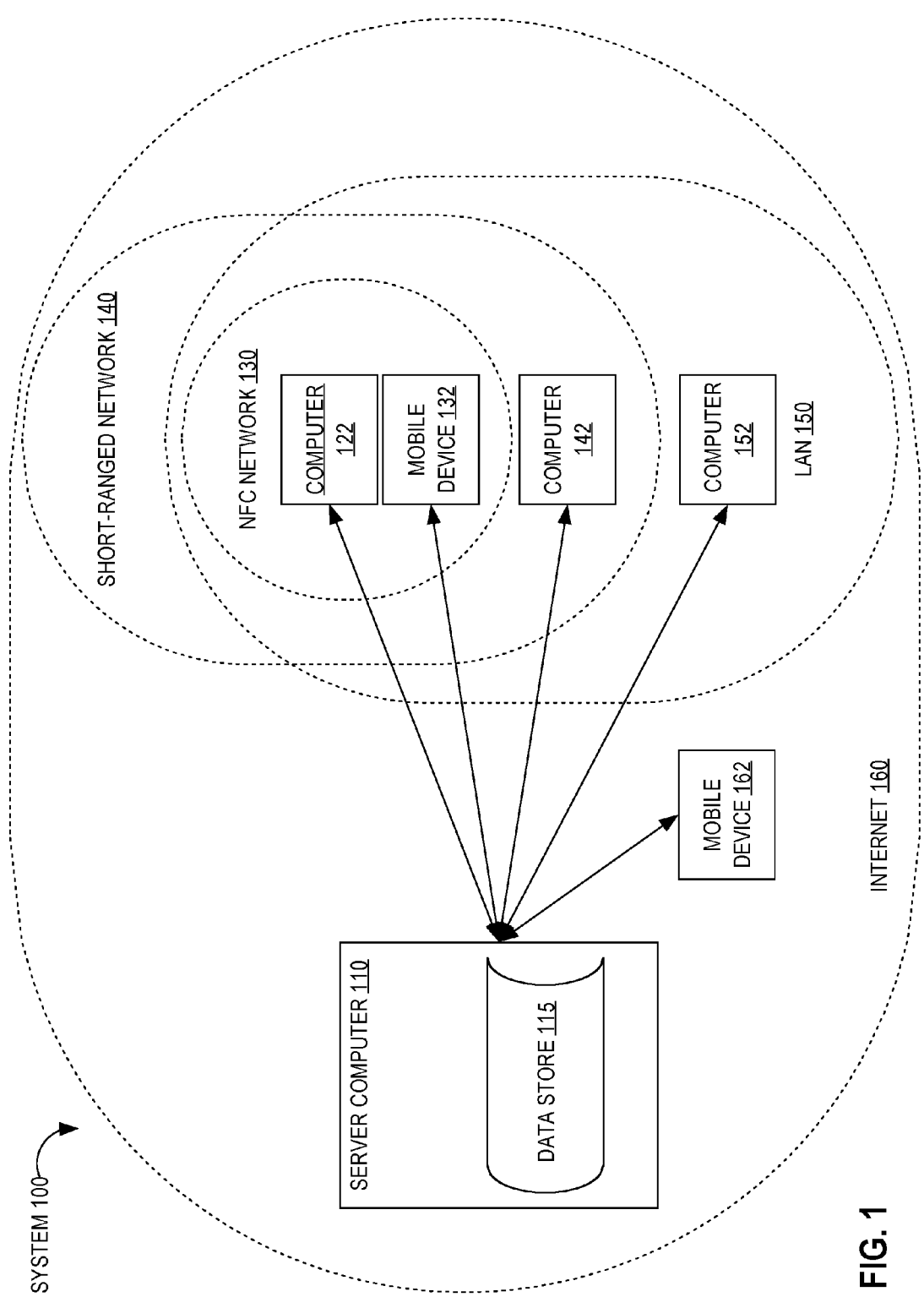
FIG. 1 illustrates a network topology for determining the types of relationships between users based on the interactions between the computers or devices that they use in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

TERMS, MEANINGS, AND EXAMPLES

For purposes of illustrating clear examples of the subject matter discussed in this disclosure, one or more meanings or examples may be associated with one or more terms throughout this disclosure. However, each meaning or example associated with each term is not meant to be exclusive. Furthermore, words, such as "or" may be inclusive or exclusive unless expressly stated otherwise. The following is a non-exclusive list of meanings and examples of particular terms used throughout this disclosure, one or more terms in the following list may be associate with one or more additional meanings or examples later discussed herein.

A "computer" or "device" may be one or more physical computers, virtual computers, and/or computing devices. As an example, a computer may be one or more desktop computers, laptop computers, mobile devices, phones, bands, watches, other wearable device, beacons, routers, cloud-based computers, and cloud-based cluster of computers, virtual computer instances or virtual computer elements such as virtual processors, storage and memory, and/or any other special-purpose computing devices. Any reference to "a computer" herein may mean one or more computers, unless expressly stated otherwise.

An "interaction" is a period of time that a computer is coupled to another computer. For example, an interaction may begin and end when a continuous connection between a first computer and a second computer begins and ends, respectively. Also for example, an interaction may begin when a first computer determines that it is coupled to a second computer over a particular network, type of network, protocol, or type of protocol; and the interaction may end when the first computer determines that it is no longer coupled to the second computer over the particular network, type of network, protocol, or type of protocol. Note, an interaction needs not be a single continuous connection. For example, an interaction may begin when a first computer sends a first request for data, such as a request for a list of files in a directory, to a second computer; throughout the interaction the first computer may send one or more additional requests for one or more related assets, such as files in the directory, to the second computer; and, the interaction may end when the first computer receives the list of files in the directory and the files in the directory from the second computer, or when all connections between the first computer and the second computer over a particular protocol are terminated. Also for example, an interaction may begin when a first computer begins streaming, or requesting a portion of, a media title, such as a movie, audiobook, or video presentation, from a second computer; the interaction may end when the client computer finishes streaming the media title, no longer requests any additional portion of the media title, or stops presenting the media title.

The notation <J, K> herein describes a set or vector of values associated with each other. For example <Bluetooth, 10 m> is a set with two values: "Bluetooth" represents the name of a particular protocol, and "10 m" represents a distance associated with the Bluetooth protocol. Values may be separated by spaces, commas, or any other character(s) to increase the ability to read and understand the description. Each set may be an entry in a data structure, such as a database table, hash table, array, or any other computer data structure.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to determine the types of relationships between people based on the connectivity between their devices. People frequently use or carry one or more computers with them that can be operably coupled together over one or more computer networks, using one or more protocols, for various durations, according to one or more frequencies, at one or more locations, etc. A first computer may be operably coupled to a second computer if the first computer can detect, communicate, or in any other way interact with to the second computer directly or indirectly through one or more other computing devices, such as a router, or Internet service provider.

Types of relationships between two users of devices can be inferred based on the protocol(s) and network interface(s) used to operably couple the devices. For example, a first mobile phone may send data to a server computer over time indicating that the first mobile phone is coupled to a second mobile phone over an 802.11 Wi-Fi network every night for a particular number of nights each week. The server computer may use relative distance profiling ("RDP") and statistical relationships between users to determine that these users live near each other because computers connected over 802.11 Wi-Fi are typically within a short radius and the particular number of nights each week may indicate that the users reside in the same room or building or neighboring buildings.

The types of relationships between two users can be supplemented or updated over time with little user interaction, if any. Continuing with the previous example, if the first mobile phone sends data to the server computer indicating that the first mobile phone was coupled to the second mobile phone over a synchronized gesture protocol or a Near Field Communication ("NFC") protocol, then the server computer may determine that the users of the first phone and the second phone are acquaintances. Also for example, if the second mobile phone sends data to the server computer indicating that the second mobile phone sent the first mobile phone one or more files over a Near Field Communication ("NFC") protocol over more than one day, then the server computer may determine that the first user and the second user are friends or neighbors. The NFC protocol is designed for transferring data over a very short distance, usually 10 cm or less; accordingly, transferring multiple files over one or more days over NFC indicates that the first user and the second user spend time together face-to-face.

The types of relationships between users may be stored in a database and used by other users. For purposes of illustrating a clear example, assume the following:

A record in the database maintained by a server computer indicates that a first user of a first device is an acquaintance, which is a type of relationship, of a second user of a second device;

The first user is an owner of a restaurant;

The first device is a computer located in the restaurant;

The first user submits a payload via the first device to the server computer to deliver the payload to a target device that is within a particular range of the first device and is associated with one or more users that are deemed to be friends or acquaintances of the second user;

The target device is operated by a target user; and
The payload is a text message indicating someone the target user knows has visited the restaurant multiple times.

If the server computer receives information from the first device or a third device indicating that the third device is within a particular distance of the first device, then the server computer queries the database to determine whether the third user is a friend or acquaintance of the second user, and if so, sends the payload to the third device.

Example Network Topology

FIG. 1 illustrates a network topology for determining the types of relationships between users based on the interactions between the computers or devices that they use in an example embodiment. In FIG. 1, system 100 comprises server computer 110, computer 122, mobile device 132, computer 142, computer 152, and mobile device 162. For convenience of expression, computers 122-162 means computer 122, mobile device 132, computer 142, computer 152, and mobile device 162. For purposes of illustrating clear examples further herein, each computer in computers 122-162 is associated with a different user; however, a user may be associated with more than one device or a device may be associated with more than one user. While two computers may be coupled through one or more other computing devices or computer networks, such as a router or the Internet, two computers may be coupled through a direct peer interaction, such as through an NFC, Bluetooth, Wi-Fi Direct, or LTE Direct interface in each of the two computers.

User Computers

A "user computer" is a computer, or a process (e.g., an application) running on a computer, that is associated with a user. A user computer may be associated with one or more identifier, such as a username entered by a user, IP address, MAC address, International Mobile Station Equipment Identity, Unique Device Identifier, or identifier assigned by an application running on the computer. A user computer may be coupled to one or more other user computers over one or more computer networks or protocols and share various types of data, such as files, games, movies, or payment information. For example, in system 100, computer 122 is a user computer that is coupled to, and may detect, the following user computers over the specified computer network or protocol:
Mobile device 132 over Near Field Communication ("NFC") network 130, using a specification, protocol, or standard, such as ISO/IEC or GSMA;
Computer 142 over short-ranged network 140, using a specification, protocol, or standard, such as ultrasound, ZigBee, or Bluetooth; and
Computer 152 over Local Area Network ("LAN") 150, using a specification, protocol, or standard, such as 802.11 Wi-Fi or Wi-Fi Direct.
Computer 162 over Internet 160, using a specification, protocol, or standard, such as HTTP or LTE.

A user computer requests data from, or sends data to, one or more other computers over one or more computer networks or protocols. For example, computer 122 is coupled to server computer 110 over Internet 160. Computer 122 may be connected to Internet 160 using a cellular network or one or more other networks or Internet service providers ("ISPs").

A user computer may generate telemetry data. Telemetry data may indicate, among other things, one or more of the following:
That a first user computer is coupled to one or more other computers;
How a first user computer is coupled to the one or more other computers (i.e., over what protocol(s) or network interface(s) a first computer is operably coupled to the one or more other computers);
What type(s) of interaction(s) took place between the first computer and the one or more other computers, such as co-op gaming, file transfers, media transfers, contact list transfers, payment transfers, or protocol handshakes;
The time(s) at which the first user computer was coupled to the one or more other computers for each interaction;
The duration over which the first user computer was coupled to the one or more other computers for each interaction;
How close the first user computer is to each of the one or more other computers during each interaction;
The geographic location of the first user computer or the one or more other computers during each interaction.

The following table, Table 1, illustrates example telemetry data generated by computer 122, sent to a server computer 110, and stored in data store 115 in an example embodiment. The telemetry data describes 11 interactions that computer 122 had with other user computers. The times in the following table or listed in other portions of the disclosure may be shown in the time zone of the user computer that submitted the telemetry data or the one or more user computers that are associated with the telemetry data. In an embodiment, times may be in a universal time, such as GMT. A user computer may include its local time zone with the generated telemetry data. The data may be associated with a computer or user profile identifier discuss further herein.

| Computer or User Profile Identifier | Average Distance | Meeting Time | Meeting Duration | Peer Interaction |
|---|---|---|---|---|
| 19274026A08D | 10 m | 08:32:03 | 00:00:23 | no |
| 73926408FC9A | 3 m | 08:55:21 | 00:01:18 | file download |
| 263591617B02 | 3 m | 09:05:02 | 03:02:54 | file sharing |
| 263591617B02 | 1 m | 12:30:33 | 00:35:45 | gaming |
| 14290224F20D | 1 m | 12:31:18 | 00:34:52 | file sharing |
| 263591617B02 | 3 m | 13:10:11 | 05:00:11 | no |
| 46226512E029 | 1 m | 13:30:00 | 01:10:15 | file sharing |
| 73926408FC9A | 10 m | 18:20:46 | 00:00:15 | no |
| 6527384688A9 | 1 m | 18:25:17 | 00:22:48 | gaming |
| 78362007D1A3 | 10 m | 18:48:50 | 00:00:20 | no |
| 26787641BE57 | 2 m | 19:02:25 | 13:19:08 | file sharing |

The user computer sends the telemetry data to a server computer. For purposes of illustrating a clear example, assume that computer 122 is coupled to mobile device 132 over NFC network 130 for 30 seconds starting at a particular time while receiving an audio file from mobile device 132. In response, computer 122 generates a first set of telemetry data indicating that computer 122 was coupled to mobile device 132 over an NFC network (or over NFC network 130 specifically) for 30 seconds for a particular interaction beginning at a particular time, and received an audio file (or a specific audio file). Computer 122 sends the first set of telemetry data to server computer 110.

A user computer may store telemetry data locally. For example, if computer 122 is not coupled to server computer 110, or if server computer 110 is otherwise unavailable, then computer 122 may store the first set of telemetry data locally. If, in one or more additional interactions, computer 122 is coupled to mobile device 132 or another computer, then computer 122 may generate one or more additional sets of telemetry data describing the one or more additional interactions and stores the one or more additional sets of telemetry data locally. When computer 122 is operably coupled to server computer 110, then computer 122 sends, to server computer 110, the first set of telemetry data and the additional one or more sets of telemetry data, if any.

The user computer can derive metrics discussed further herein, such as a frequency, from the telemetry data sets and send telemetry data indicating a particular frequency to the server computer. For example, computer 122 may determine that it is coupled to, and on average has 1.2 interactions with, computer 152 every weekday during working hours. Computer 122 may send the data describing the frequency to server computer 110. Metrics or other data derived from telemetry data may also be referred to as telemetry data.

Server Computer

A "server computer" may be a computer that receives, processes, or responds to one or more requests from one or more computers. For example, in system 100, server computer 110 may receive and store telemetry data that indicates one or more interactions took, or are taking, place between two or more computers as discussed herein.

Server computer 110 may store data in data store 115. In system 100, data store 115 is part of server computer 110. However, in an embodiment, data store 115 may be operably coupled to server computer 110, but need not be part of server computer 110.

A server computer may generate a user profile, such as a database record that comprises data that identifies, or corresponds with, a user or a user computer. For example, a user may enter a username and password into a program executing on computer 122; in response, computer 122 sends the username and password to server computer 110. Server computer 110 creates a new user profile that includes the username and password if a corresponding user profile is not already created. Additionally or alternatively, server computer 110 may receive a computer identifier, such as computer 122's MAC address; server computer 110 may generate a computer profile that identifies, or corresponds to, computer 122. Server computer 110 may associate the user profile with the computer identifier. In an embodiment, each computer is presumed to have a single user. Accordingly, a user profile and a computer profile are the same profile. For convenience of expression, a profile may be a user profile or a computer profile, and the profile may correspond with a user or a computer.

A server computer stores telemetry data and associates the telemetry data with one or more profiles. For example, if server computer 110 receives telemetry data from computer 122, then server computer 110 stores the telemetry data in data store 115, and associates the telemetry data with the profile that corresponds with computer 122. Server computer 110 may associate the telemetry data, or portions of the telemetry data, with one or more other profiles referenced in the telemetry data.

A server computer may aggregate and store telemetry data received from one or more user computers. For example, for each user computer that computer 122 interacted with, at each location, and for each interaction type, server computer 110 determines the following aggregated data:

The frequency at which computer 122 interacted with the user computer;

The longest, shortest, median, and/or average time at which computer 122 interacted with the user computer;

The longest, shortest, median, and/or average duration over which computer 122 interacted with the user computer;

The longest, shortest, median, and/or average distance over which computer 122 interacted with the user computer.

Server computer 110 stores the aggregate data in data store 115 and associates the aggregated data with each profile that the aggregate data identifies or corresponds to. The following table, Table 2, illustrates aggregated telemetry data (generated by server computer 110 stored in data store 115) that identifies multiple interactions computer 122 had with other user computers, in an embodiment. Data in this table will be discussed further herein.

| Row | Physical Location (Social Location) | Computer or User Profile Identifier | Frequency | Mean Meeting Time | Mean Meeting Duration | Peer Interaction |
|---|---|---|---|---|---|---|
| 1 | #1 (transit station) | 73926408FC9A (media kiosk) | 2.5/week | 08:52:32 | 00:01:30 | file download |
|   |   |   | 2.4/week | 08:54:19 | 00:00:13 | no |
|   |   |   | 4.9/week | 18:21:22 | 00:00:14 | no |
| 2 | #2 (office) | 263591617B02 (colleague #1) | 4.8/week | 09:02:02 | 03:10:12 | file sharing |
|   |   |   | 3.9/week | 13:15:10 | 04:55:37 | file sharing |
| 3 | #2 | 14290224F20D (colleague #2) | 2.9/week | 13:20:28 | 04:40:49 | file sharing |
| 4 | #3 (diner) | 263591617B02 (colleague #1) | 1.8/week | 12:31:45 | 00:33:56 | file sharing, gaming |
| 5 | #3 | 14290224F20D (colleague #2) | 0.5/week | 12:32:11 | 00:32:43 | file sharing, gaming |
| 6 | #4 (transit station or route) | 6527384688A9 (co-commuter) | 2.2/week | 18:24:38 | 00:24:01 | gaming |
| 7 | #5 (bodega) | 78362007D1A3 | 4.9/week | 18:49:35 | 00:00:19 | no |
| 8 | #6 (home) | 26787641BE57 (spouse) | 2.7/week | 19:05:03 | 13:17:23 | file sharing |
|   |   |   | 0.9/week | 20:34:49 | 11:47:38 | file sharing |
|   |   |   | 0.8/week | 20:22:18 | 35:03:55 | file sharing |

A server computer may receive queries or payloads and send the payloads to one or more user computers that satisfy the queries. For purposes of illustrating a clear example, assume computer 122 sends a query and a payload to server computer 110, the query defines one or more parameters that, if satisfied by a target user computer, cause server computer 110 to send the payload to the target user computer. If server computer 110 receives telemetry data from computer 142 that satisfies the one or more parameters, then server computer 110 may send the payload to computer 142. In response, user computer 142 causes a display to display (or otherwise present) the payload to the user using computer 142.

Relative Distance Profiling

Determining the distance between two devices is referred to herein as Relative Distance Profiling ("RDP"). The relative distance between two devices can be determined using one or more factors, such as the protocol(s) or computer interface(s) over which the two devices are coupled. For example, computer 122 or data store 115 may maintain a table with the following entries, each of which associates a computer interface or protocol with a proximity or distance:
<mobile base stations, 1 kilometer>,
<Wi-Fi, 50 meters>,
<Wi-Fi Direct, 50 meters>,
<Bluetooth, 10 meters>,
<acoustic (speakers and microphone), 10 meters>,
<visual (display and camera), 1 meter>,
<NFC chip, 4 centimeters>.

A user may add, remove, or modify any of the protocols, network interfaces, or distances related to the protocols. An acoustic computer interface or protocol may be a proprietary interface or protocol that transmits data via tones. For example, a first computer may send data, via ultrasonic tones that represent one or more data values, from one or more speakers coupled to the first computer, and a second computer may receive the data through one or more microphones coupled to the second computer or vice versa.

In response to receiving data from computer 122 indicating that computer 122 is coupled to computer 142 over short-ranged network 140 using a Bluetooth radio coupled to computer 122, server computer 110 can determine that computer 142 is within 10 meters of computer 122. Additionally or alternatively, a user computer may include distance mappings or other metrics, determine the distance between the user computer and another user computer, or send the determined relative distance to server computer 112.

Geographic Location

The relative distance between two computers may be determined based on geographic location, such as latitude and longitude coordinates. Additionally or alternatively, a geographic location may be a region, such as a distance associated with a mailing address or radius associated with a longitude and latitude.

Server computer 110 may store data in data store 115 that defines one or more geographic locations received in telemetry data or other sources, such as a map repository. For purposes of illustrating a clear example, assume server computer 110 receives, from computer 122 or mobile device 162, telemetry data that indicates computer 122 is coupled to mobile device 162 over Internet 160. In response to determining that computer 122 and mobile device 162 are coupled over Internet 160, server computer 110 may request the geographic location of computer 122 and mobile device 162 to determine the distance between computer 122 and mobile device 162. Additionally or alternatively, computer 122 or mobile device 162 may send the geographic location of computer 122 or mobile device 162 without a request from server computer 110.

The geographic location of one computer may be determined based on the geographic location of another computer and determining the computer interface(s) or protocol(s) used to couple the two computers. For purposes of illustrating a clear example, assume the following:
Computer 122 does not include a Global Positioning System ("GPS") chip, or does not allow one or more applications or services to have access to the GPS chip or determine a geographic location from the GPS chip;
Mobile device 132 does include a GPS chip and allows applications or services running on mobile device 132 to have access to the GPS chip and determine a geographic location from the GPS chip;
Mobile device 132 sent financial information to computer 122 over an NFC network, which is associated with a particular distance;
Mobile device 132 determines its particular geographic location using the GPS chip.

Mobile device 132 determines that the particular distance is associated with an NFC network, and accordingly, computer 122 is within the particular distance from the particular geographic location. Mobile device 132 sends telemetry data to server computer 110 indicating that mobile device 132 was coupled to computer 122, sent financial information to computer 122, and computer 122 is within the particular distance from the particular geographic location. Additionally or alternatively, mobile device 132 sends telemetry data to server computer 110 indicating that mobile device 132 was coupled to computer 122, sent financial information to computer 122 over an NFC network. In response, server computer 110 determines that computer 122 is within a geographic region within the particular distance from the particular geographic location. Server computer 110 may receive a geographic location comprising a latitude and longitude from mobile device 132, and store, in data store 115, the latitude and longitude in a profile associated with mobile device 132. Server computer 110 may store, in data store 115, data describing the geographic region that computer 122 is located in, and associate the data with a profile associated with computer 122.

Associating Social Locations to Physical Locations

One or more factors discussed herein may be used to associate a social location, such as home, work, or school, to one or more physical locations. For example, in response to determining that two or more devices are coupled for a mean meeting time at or after 5:00 PM, for at least a mean meeting duration equal to or greater than 10 hours, at a frequency greater than 4 times a week, server computer 110 may determine that the particular physical location is a home. For purposes of illustrating another clear example, assume the following:
Table 2 illustrates aggregated telemetry data for mobile device 132;
Computer or User Profile Identifier 263591617B02 corresponds to computer 142;
Computer or User Profile Identifier 14290224F20D corresponds to computer 152;
A first set of one or more office parameters stored in data store 115 indicate the following thresholds: devices are coupled three or more times per week, for an average duration of one or more hours;

A second set of one or more office parameters stored in data store 115 indicate the following thresholds: devices are coupled two or more times per week, for an average duration of 2.5 or more hours.

Server computer 110 compares the thresholds with the data in Table 2 to assign a type of social location to one or more of the enumerated location. For example, server computer 110 may determine that Location #2 is an office for one or more of the following reasons:

- The telemetry data in second row of Table 2 satisfies the first set of office parameters: mobile device 132 is, on average, coupled to computer 142 (Computer or User Profile ID 263591617B02) at a frequency (4.8/week) that is equal to or greater than the first office frequency threshold (three times per week) and for an average duration (3 hours and 10 minutes) that is equal to or greater than the first office duration threshold (one hour);
- Telemetry data in the third row of Table 2 satisfies the second set of office parameters: mobile device 132 is, on average, coupled to a computer 152 (Computer or User Profile ID 14290224F20D) at a frequency (2.9/week) that is equal to or greater than the second office frequency threshold (two times per week) and for an average duration (4 hours and 40 minutes) that is equal to or greater than the second office duration threshold (2.5 hours).

In response to determining that one or more sets of office parameters are satisfied, server computer 110 associates the corresponding type of social location to Location #2—"office". In one or more examples herein, a threshold is a single value; however, a threshold may be a range of values, such as a minimum threshold value and a maximum threshold value. Accordingly, server computer 110 may make one or more determinations, or perform one or more actions, based on telemetry data, or data derived from telemetry data, being less than, equal to, or greater than a particular threshold value or within a particular threshold range.

A location may have more than one social location. For example, an apartment may be located above a store in a particular building; accordingly, the location of the building could be associated with two types of social locations—"residence" and "store".

In the previous example, frequency and mean meeting duration were used to associate a particular type of social location (office) to the Location #2; however, one or more other factors may be used. For purposes of illustrating a clear example, assume a set of one or more home parameters indicate the following thresholds: devices are coupled at a mean meeting time after 5:00 PM and before 3:00 AM of the following day for a mean meeting duration of eight or more hours, and the interaction includes sharing one or more files. In response to server computer 110 determining that aggregated telemetry data in Row 8 satisfies the one or more home parameters, server computer 110 associates the corresponding type of social location to Location #6—"home".

A type of social location can be assigned to a particular location based on peer interaction. For example, if gaming takes place at a particular location at or above a particular frequency, then server computer 110 may associate the location with a "home", "lounge", "cyber café", "commuter station", or "commuter route", but not "office". The particular type of location associated with a location may be further determined based on mean meeting time or mean meeting duration.

A type of social location can be assigned to a particular location based on the type of computer network(s) or protocol(s) used to couple two devices and the type of information exchanged. For example, in response to processing telemetry data indicating that a particular computer at a particular location receives credit card information, at or above a particular frequency, over an NFC protocol, server computer 110 may determine that the first computer at a particular location is a checkout register at a store. Accordingly, server computer 110 may associate the particular location with "store".

The type of social location assigned to a geographic location may be based on one or more relationships between users at that location. For purposes of illustrating a clear example, assume a set of one or more office parameters indicates that if at least two pairs of users are determined to be professional colleagues, then the location is an office. Accordingly, in response determining that the user using Computer or User Profile Identifier 263591617B02 is a first working professional colleague of the user using mobile device 132 and the user using Computer or User Profile Identifier 14290224F20D is a second professional colleague of the user using mobile device 132, which satisfies the particular set of one or more office parameters, server computer 110 associates the corresponding type of social location to Location #2—"office".

In an embodiment, if server computer 110 determines that a particular computer, such as computer 122, satisfies one or more of the following parameters based on telemetry data, then server computer 110 may determine the computer is in a store:

- Computer 122 is fixed at a geographic location that is defined as a "public place";
- Computer 122 interacts with several devices over an NFC network;
- Computer 122 receives purchase or credit/debit card data;
- Computer 122 is discoverable by mobile devices visiting or passing by the geographic location in which computer 122 is located.

In these examples, server computer 110 received telemetry data and associated one or more types of social locations to one or more physical locations. However, a user computer may associate one or more types of social locations with one or more physical locations and send telemetry data to server computer 110 that indicates which one or more types of social locations are assigned to the one or more physical locations.

Determining Relationships Between Users of User Computers

Figure 2:
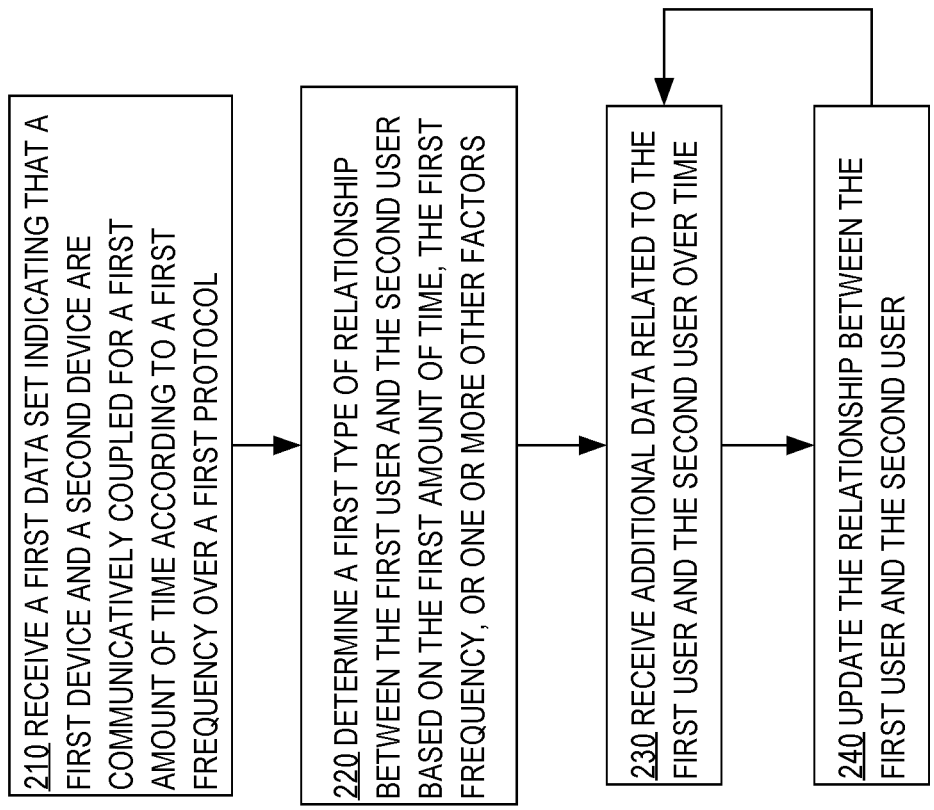
FIG. 2 illustrates a process for determining and refining the relationship between a first user and a second user that correspond to a first user computer and a second user computer, respectively, based on telemetry data indicating that the first user computer and the second user computer are or were operably coupled in an example embodiment.

The relative social distance or type of relationship between two users may be determined based on one or more factors, such as a user's routine, one or more physical locations, one or more social locations, telemetry data, or data derived from telemetry data. FIG. 2 illustrates a process for determining and refining the relationship between a first user and a second user that correspond to a first user computer and a second user computer, respectively, based on telemetry data indicating that the first user computer and the second user computer are or were operably coupled in an example embodiment. In step 210, a server computer receives a first data set indicating that a first device and a second device are operably coupled for a first amount of time according to a first frequency over a first protocol. For purposes of illustrating a clear example, assume the following:

Computer 122 is executing a file sharing program that creates an ad-hoc Wi-Fi network, LAN 150, with a particularly formatted name over a first proprietary protocol;

Mobile device 132 is executing the same file sharing program, and the file sharing program periodically checks for a Wi-Fi network with the particularly formatted name over the first protocol;

In response to determining that LAN 150 has the particularly formatted name, mobile device 132 couples to, and interacts with, computer 122 by periodically requesting a list of downloadable files from computer 122 over the first protocol;

Computer 122 is used by a first user;

Mobile device 132 is used by a second user.

Each time mobile device 132 detects the Wi-Fi network and couples to computer 122, mobile device 132 generates telemetry. The telemetry data may include, among other things, the following:

What time mobile device 132 discovered or was coupled to computer 122;

How long mobile device 132 interacted with computer 122;

What protocol was used;

What type of device mobile device 132 is;

What type of device computer 122 is;

The geographic location of mobile device 132;

The number of files shared;

The types of files that were shared, if any;

Audio data, such as an audio recording or the average decibel level recorded by mobile device 132 while computer 122 and mobile device 132 are interacting or coupled.

Mobile device 132 sends the telemetry data to server computer 110. Mobile device 132 may send the telemetry data to server computer 110 as mobile device 132 generates the telemetry data, after a particular amount of time, after a particular amount of telemetry data is generated, or according to another schedule.

Based on the telemetry data received from mobile device 132, server computer 110 may determine, among other things, the following metrics:

A first frequency at which computer 122 was coupled to, or interacted with, mobile device 132;

A first average amount of time each interaction lasted;

An average time at which each interaction started;

A first distance between computer 122 and mobile device 132 using RDP;

A particular set of days of the week that computer 122 was coupled to, or interacted with, mobile device 132;

A physical location of computer 122 or mobile device 132;

A social location of the physical location;

An average number of files shared at each interaction;

The average decibel level recorded during an interaction.

In step 220, the server computer determines a first type of relationship between the first user and the second user based on the first amount of time, the first frequency, and/or one or more other factors. For example, server computer 110 may determine that the second user is merely visiting the first user if the first frequency is one. Also for example, server computer 110 may determine that the first user and the second user are "professional colleagues" if one or more of the following are true:

The type of social location associated with the physical location is "office";

At least one file, on average, was shared between the two computers;

The types of files are word processing or presentation documents.

Server computer 110 may determine that the first user and the second user work near each other ("office neighbors") if the first frequency is more than 4 times a week, but no files were shared. Server computer 110 may determine that the first user is a "customer" of the second user if the types of files or data transmitted are financial records or records with a credit card number. Server computer 110 may determine that the first user is a customer of the second user if the average time at which each interaction started is between noon and 1 PM, the average duration of which is less than an hour, and the frequency is at least one per week.

Server computer 110 may determine that the first user and the second user are "friends" if the types of files shared include photos, music, or videos. Server computer 110 may determine that the first user and the second user are classmates if one or more of the following are true: if the average starting time is within five minutes of a particular time with a standard deviation below a particular threshold; the particular time is an even time, such as the top of an hour; the particular set of days of the week are week days, not weekends; the type of social location associated with the physical location is "school".

After server computer 110 determines that the first user and the second user are classmates, then server computer 110 may determine what type of classroom settings the first user and the second user are in. For example, if the average decibel level is less than or equal to a particular threshold, then server computer 110 determines that the first user and the second user are meeting in a library. Additionally or alternatively, if the decibel level is above a particular threshold, then the server computer may determine that the first user and the second user are in a school cafeteria. Additionally or alternatively, if the audio data, or voice recognition processing the data, indicates that a single voice is talking or server computer 110 receives additional telemetry data indicating that other users associated with other devices are in the same location, then server computer 110 may determine that a first student and the second student are meeting in a classroom. Additionally or alternatively, if average frequency of interaction is equal to or greater than a particular threshold, such as six, and the average duration of each interaction is greater than a particular threshold, such as 10 hours, then server computer 110 may determine that the first user and the second user are roommates.

In step 230, the server computer receives additional data related to the first user and the second user over time. For purposes of illustrating a clear example, assume the facts from the examples in step 210 and step 220, and assume the following:

In response to receiving input indicating the user selected a particular file from a list downloadable files from computer 122, mobile device 132 generates NFC network 130 via an NFC chip in mobile device 132, requests the particular file from computer 122 via an NFC chip in computer 122 over an NFC protocol, and receives the particular file over NFC network 130 according to the NFC protocol;

The file is a song file;

Mobile device 132 generates telemetry data indicating that mobile device 132 received a music file via an NFC chip over NFC network 130, and computer 122 is within 10 cm of mobile device 132 based on the computer interface and protocol used;

Server computer 110 has already determined that the first user and the second user are classmates.

Accordingly, mobile device 132 generates the new telemetry data indicating the above-discussed events, and sends the new telemetry data to server computer 110. Server computer 110 may derive additional data or metrics from the new telemetry data and store the new telemetry data along with any derived data or metrics in data store 115.

In step 240, the server computer updates the relationship between the first user and the second user. For example, in response to determining mobile device 132 received a music file from computer 122, server computer 110 determines that the first user and the second user are at least acquaintances rather than merely classmates. As another example, server computer 110 may determine, based on a lack of interactions between mobile device 132 and computer 122, to change the type of relationship from acquaintances to classmates or to former classmates.

Server computer 110 may repeat step 230 and 240. For example, after additional telemetry data is received, if computer 120 frequently sends files to, or receives files from, mobile device 132 over an NFC interface or protocol, then server computer 110 may determine whether the frequency is above a particular threshold, and if so, update the type of relationship to "friends".

In response to determining that a first user has a type of relationship with a second user, server computer 110 may store data in data store 115 indicating the type of relationship between the two users. For example, server computer 110 may store data in data store 115 indicating that the profile that corresponds to computer 122 and the profile that corresponds to mobile device 132 are related, and specifically that the users that correspond to the two profiles are friends.

Sending a Payload to a User Computer

Figure 3:
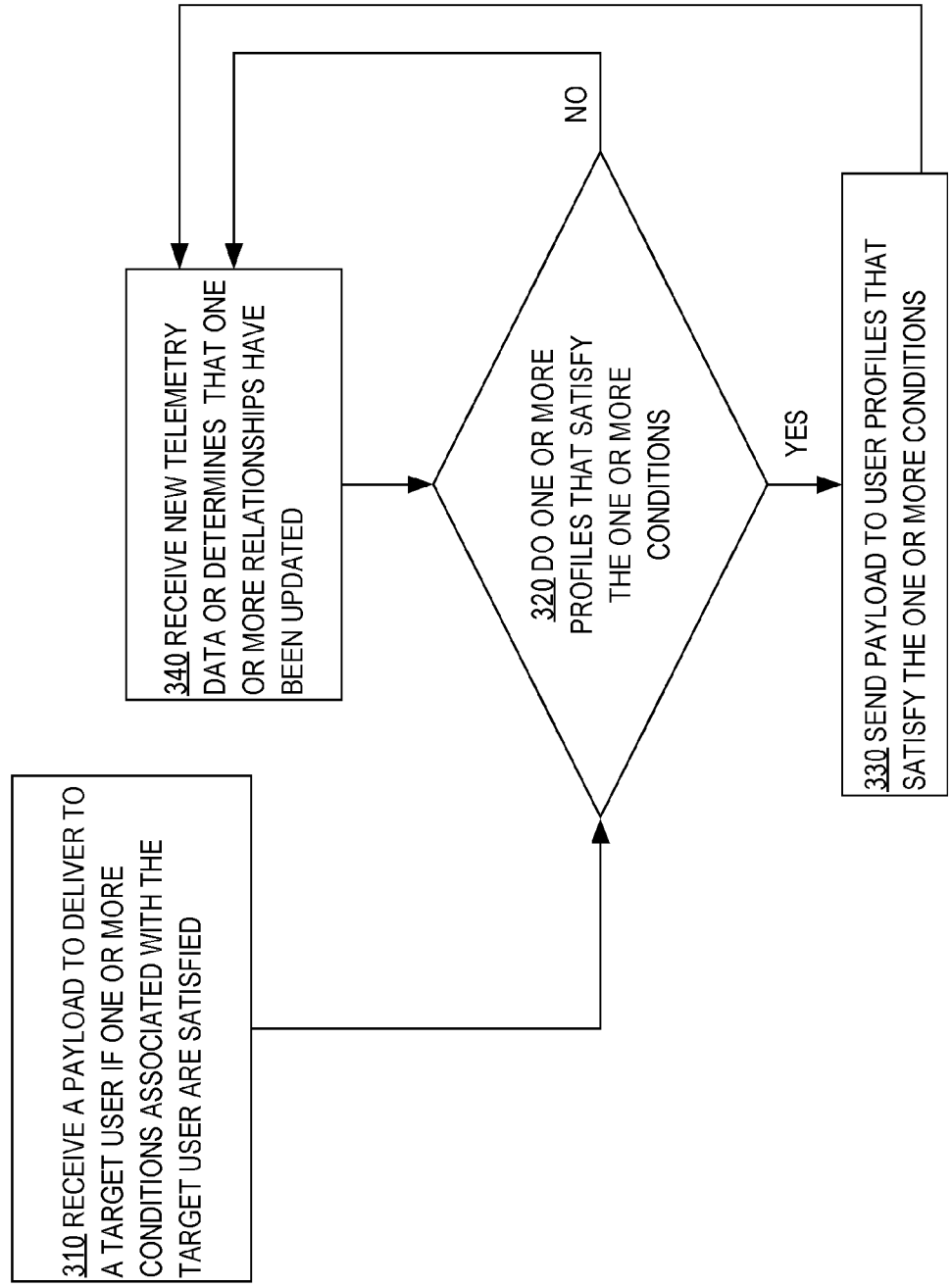
FIG. 3 illustrates a process for receiving a payload from a user and sending the payload to one or more target user computers in an example embodiment.
Figure 4:
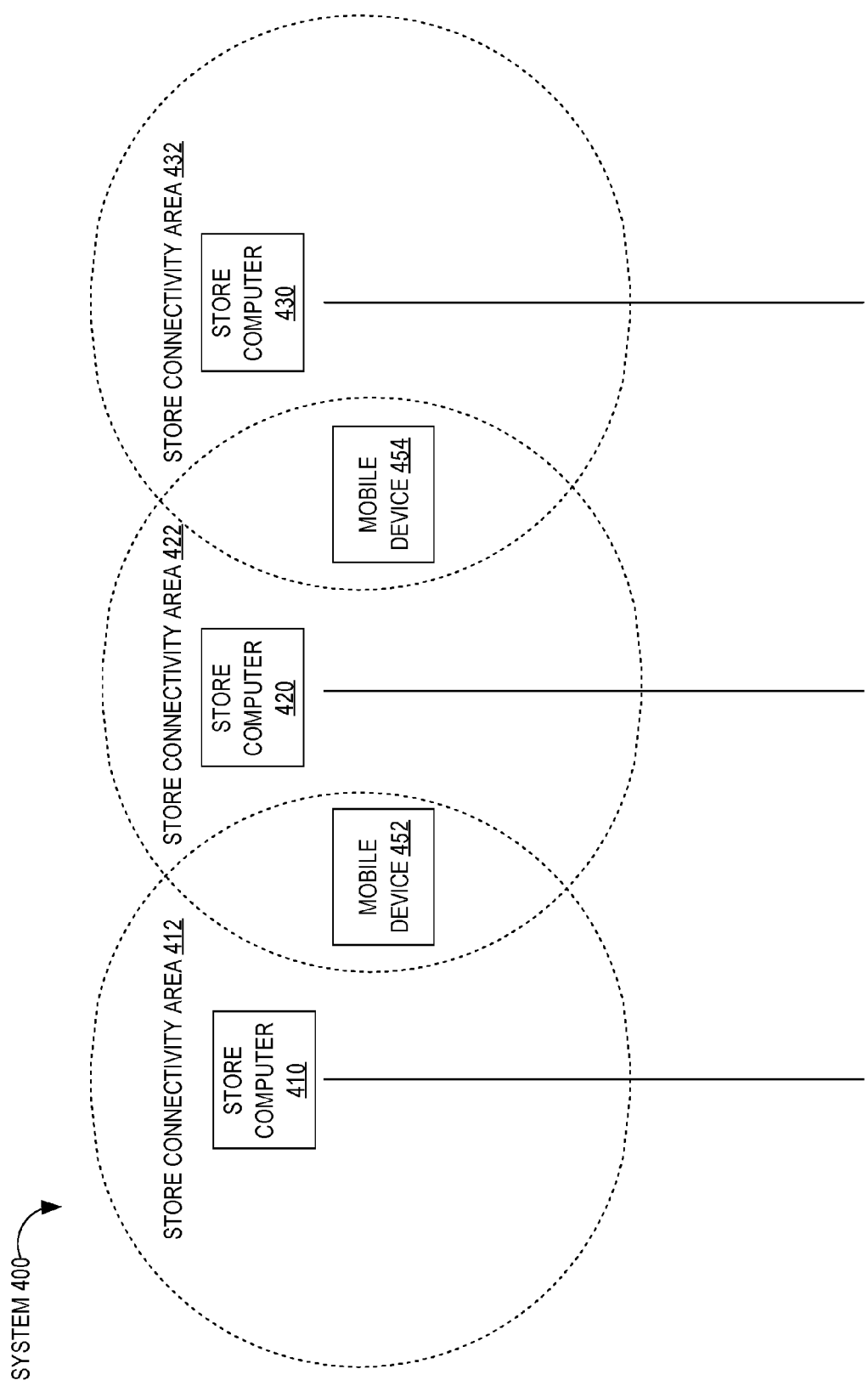
FIG. 4 illustrates a system for sending targeted messages to one or more target user computers in an embodiment.

A server computer may receive a request to send a payload to a target user or user computer based on one or more conditions. A payload may be text, digitally stored multimedia, or any other content for electronic delivery. FIG. 3 illustrates a process for receiving a payload from a user and sending the payload to one or more target user computers in an example embodiment. FIG. 4 illustrates a system for sending targeted messages to one or more target user computers in an embodiment. In FIG. 4, system 400 includes three store computers spread across a geographic region: store computer 410, store computer 420, and store computer 430, collectively referred to herein as the store computers. System 400 includes two mobile devices: mobile device 452 and mobile device 454. Each store computer of the store computers can be wirelessly coupled to one or more devices within the store computer's surrounding circular region demarcated by a dotted circle. Accordingly, in system 400, mobile device 452 is operably coupled to store computer 410 and store computer 420, but not store computer 430; mobile device 454 is operably coupled to store computer 420 and store computer 430, but not store computer 410.

Each of the computers in system 400 may generate and send telemetry data to a server computer, such as server computer 110 (not illustrated in FIG. 4). While the store computers are not labeled as mobile devices, a store computer may be a user computer, such as a mobile device. One or more of the store computers may be in the store or in different stores. Additionally or alternatively, one or more of the store computers may be on different aisles in the same store.

In step 310, a server computer receives a payload to deliver to a target user if one or more conditions associated with the target user are satisfied. For example, the manager for a store with store computer 410 may upload a payload through store computer 410 that includes the following message: "You have a friend that shops here." The manager may also upload data indicating that the message should be sent to target user computers that are determined to be within a particular distance from store computer 410, and have a "friend" type of relationship with a user that has a "customer" type of relationship with a computer associated with the store, such as store computer 410. The one or more users that connect a target user to the user that wants to send a payload to the target user, may be referred to herein as intermediate users.

In step 320, the server computer searches for one or more profiles that satisfy the one or more conditions. For example, server computer 110 may search profiles, telemetry data, aggregated telemetry data, RDP data, or any other data discussed herein to find one or more profiles that satisfy the conditions. If one or more profiles satisfy the conditions, then server computer 110 proceeds to step 350. For purposes of illustrating a clear example, assume the following:

Server computer 110 determines that the profile corresponding to mobile device 454 has the first target type of relationship with store computer 410—customer;

Server computer 110 determines that the profile corresponding to mobile device 454 and the profile corresponding to mobile device 452 have the second target type of relationship—friends; and Based on telemetry data indicating that mobile device 452 is coupled to store computer 410 over store connectivity area 412, server computer 110 determines that mobile device 452 is in the store that corresponds to store computer 410.

Accordingly, server computer 110 determines that the profile corresponding to mobile device 452 satisfies the conditions. Control proceeds to step 330.

In step 330, the server computer sends the payload to user profiles that satisfy the one or more conditions, if any. Continuing with the previous example, server computer 110 sends the payload to mobile device 452. Server computer 110 may send the payload via a Short Message System ("SMS"), email, push notification via an operating system executing on mobile device 452, or one or more other electronic delivery methods.

In an embodiment, the message in the payload may include tokens that can be replaced to generate a more personal message. For example, the payload may include a token, such as "\\name\\", indicating that the name of the target user should replace the token in the payload. The payload may include additional tokens. For example, the payload may include another token, such as "\\friend's name\\", indicating the target user's friend's name should replace the token in the payload. Accordingly, if the target user's name is Brad, the target user's friend's name is Jim, and the payload is "Hi \\name\\, your friend, \\friend's name\\, shops at XYZ Store.", then the server computer 110 may send the following message to mobile device 452: "Hi Brad, your friend, Jim, shops at XYZ Store." In this case, Jim is referred to herein an intermediary user.

Whether or not one or more profiles satisfy the one or more conditions, the server computer may continue to monitor telemetry data or any other data discussed herein for new profiles that may satisfy the one or more conditions. Accordingly, if in step 320, the server computer determines that no profiles satisfy the one or more conditions, or after performing step 330, control may proceed to step 340. In step 340, the server computer determines that one or more relationships or profiles have changed and, in response, control returns to step 320. For example, server computer 110 may receive additional telemetry data, update one or more profiles accordingly, and return to step 320.

Generating More Specific Messages Based on Tags

A server computer may associate one or more tags with a profile. A tag is metadata that describes one or more attributes of the corresponding user or user computer. The server computer may generate tags from telemetry data. For example, if server computer receives telemetry data indicating that a particular user computer is coupled to a game server at a particular average frequency that is above a threshold frequency, then the server computer may associate a tag called "gamer" with the profile that corresponds to the particular user computer or the user of the particular user computer.

A request to send a payload to a target user or user computer may be based on a tag. For purposes of illustrating a clear example, assume the following:
 Store computer 410 and store computer 420 are inside of a shopping mall, but each computer is in a different store;
 Store computer 410 is in an arcade;
 Store computer 420 is in a cobbler's shop;
 Server computer 110 received a request from a first administrator, through store computer 410, for server computer 110 to send a user computer a payload message if the user computer corresponds to a profile that plays video games and is within a particular range of store computer 410;
 Server computer 110 received a request from a second administrator, through store computer 420, for server computer 110 to send a user computer a payload message if the user computer corresponds to a profile that frequently buys shoes and is within a particular range of store computer 420;
 The profile associated with mobile device 452 is associated with a "gamer" tag.

If mobile device 452 sends telemetry data to server computer 110 indicating that mobile device 452 is coupled to store computer 410 and store computer 420, then server computer 110 will send the first payload, and not the second payload, to mobile device 452 in response to determining that the profile associated with mobile device 452 is associated with the "gamer" tag.

Generating More Specific Messages Based on Location within a Store

A server computer may send more specific messages based on a user computer being coupled with, or within a proximity to, more than one other user computer. For purposes of illustrating a clear example, assume the following:
 Store computer 410, store computer 420, and store computer 430 are located on different aisle dividers of the same store;
 Server computer 110 receives data indicating that the area between the first aisle divider, with store computer 410, and the second aisle divider, with store computer 420, is referred to as Aisle A;
 Server computer 110 receives data indicating that the area between the second aisle divider, with store computer 420, and the third aisle divider, with store computer 430, is referred to as Aisle B;
 Aisle A is a health food aisle;
 Aisle B is a candy aisle;
 Server computer 110 received a first request from an administrator of the store that people in Aisle A that frequently buy vegetables should receive a first payload indicating that carrots are on sale;
 Server computer 110 received a second request from the administrator of the store that people located in Aisle B for more than three uninterrupted minutes at a time should receive a second payload indicating that candy is on sale.

Server computer 110 may determine that mobile device 452 is in Aisle A if server computer 110 receives telemetry data from mobile device 452 (or any other computer, such as store computer 410) indicating that mobile device 452 is receiving the strongest wireless signal from store computer 410 and store computer 420. Server computer 110 may determine that mobile device 454 is in Aisle B if server computer 110 receives telemetry data from mobile device 454 (or any other computer, such as store computer 420) indicating that mobile device 454 is receiving the strongest wireless signals from store computer 420 and store computer 430. In response to receiving telemetry data indicating that mobile device 452 is in Aisle A and mobile device 452 is associated with a profile with a "vegetarian" tag, server computer 110 sends mobile device 452 the first payload. In response to receiving telemetry data indicating that mobile device 452 has been in Aisle A for at least three continuous minutes, server computer 110 sends mobile device 452 the first payload.

Additionally or alternatively, server computer 110 may receive a request to deliver a payload when a user computer is within a target proximity to a target store, location, or region. For example, server computer 110 may receive a first request from an administrator of the store indicating that people within a target proximity to Aisle B, which includes the area covered by store computer 430, should receive the second payload. Accordingly, in response to receiving telemetry data from a user computer, such as store computer 430 or mobile device 454, indicating store computer 430 and mobile device 454 are operably coupled, server computer 110 may send the second payload to mobile device 454. Server computer 110 may send the second payload to mobile device 454 through one or more computers, such as store computer 430.

A payload request may include one or more tags to associate with a profile. For example, the payload request for users that are in Aisle B for more than three continuous minutes may include a new "junk food connoisseur" tag to associate with users or profiles that receive the payload. Accordingly, server computer 110 may associate the "junk food connoisseur" tag to the profile associated with mobile device 454 or any other device that triggers the corresponding payload to be sent.

Server computer 110 may determine statistics based on tags associated with user computers. For example, if a store has store computer 410 and store computer 430, and store computer 410 has a "men's clothing" tag and store computer 430 has a "women's clothing" tag, then server computer 110 may determine the frequency and duration at which users with mobile devices and various other tags visit the men's section of the store (the area closer to store computer 410) and the women's section of the store (the area closer to store computer 430).

Additional Uses

Using one or more of the methods discussed herein, a server computer may determine which areas are most densely populated. Continuing from the example above, server computer 110 may receive telemetry data indicating that on each day, on average, 200 user computers are in Aisle A and 50 user computers are in Aisle B. Server computer 110 may send the data in an email to a store manager. In response, the store manager may put more expensive items in Aisle A, or put items in Aisle A throughout the store to decrease congestion in Aisle A.

Server computer 110 may receive telemetry data from mobile devices indicating which one or more geographic locations were visited before or after shopping at a current store. Server computer 110 may provide the social locations associated with the one or more geographic locations to a store manager, as well as a breakdown of which social locations were visited most frequently before or after the current store. The store manager may update the store to include the products or services in at least one of the one or more geographic locations or associated social locations based on the breakdown of social locations.

Figure 5:
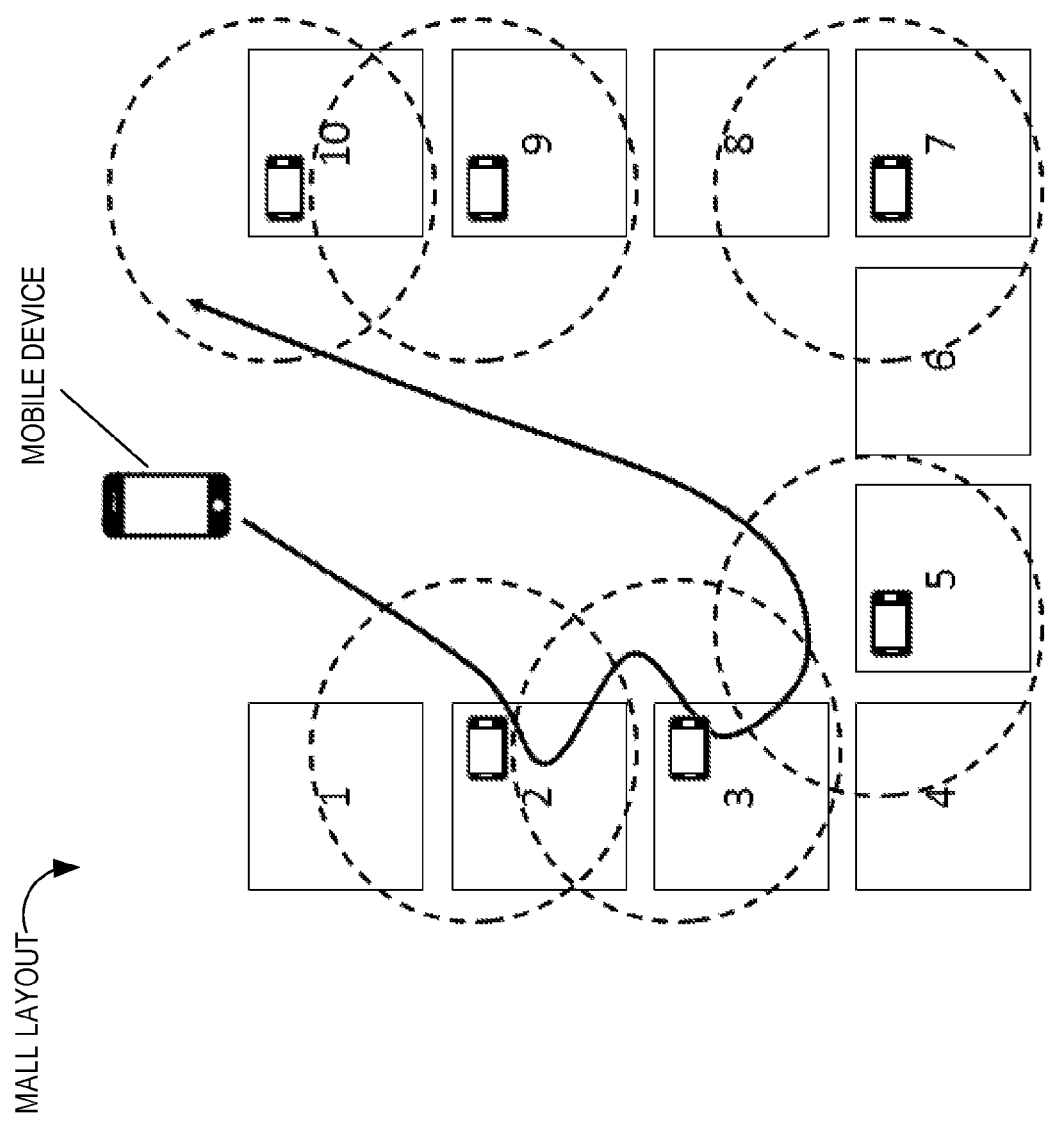
FIG. 5 illustrates an example path that a server computer may determine that mobile device took in a group of stores, such as a mall, in an example embodiment.

In the example of a mall above, server computer 110 may send a mall administrator data indicating the usual paths patrons take from store to store, how long patrons were in various stores, or one or more other metrics. FIG. 5 illustrates an example path that a server computer may determine that mobile device took in a group of stores, such as a mall, in an example embodiment. The computer illustrated in each store in the mall may be a mobile device, beacon, router, or other computer. The server computer may send the data for one or more user computers to a store or mall manager. For example, the server computer may send data to the owner of store 3 indicating that visitors often visit store 2 before visiting store 3. As another example, the owner of store 5 may choose to stock more products or services that are more similar to, or complement, products or services in store 3.

If a server computer determines that a user computer visits a store at or above a frequency threshold or a duration threshold, then the server computer may associate a tag with the corresponding profile indicating that the corresponding user is a loyal patron of the store. A store manager may send a payload request to the server computer, which causes the server computer to send a payload, such as a coupon, to be sent to user computers associated with profiles that have been determined to correspond to loyal patrons.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
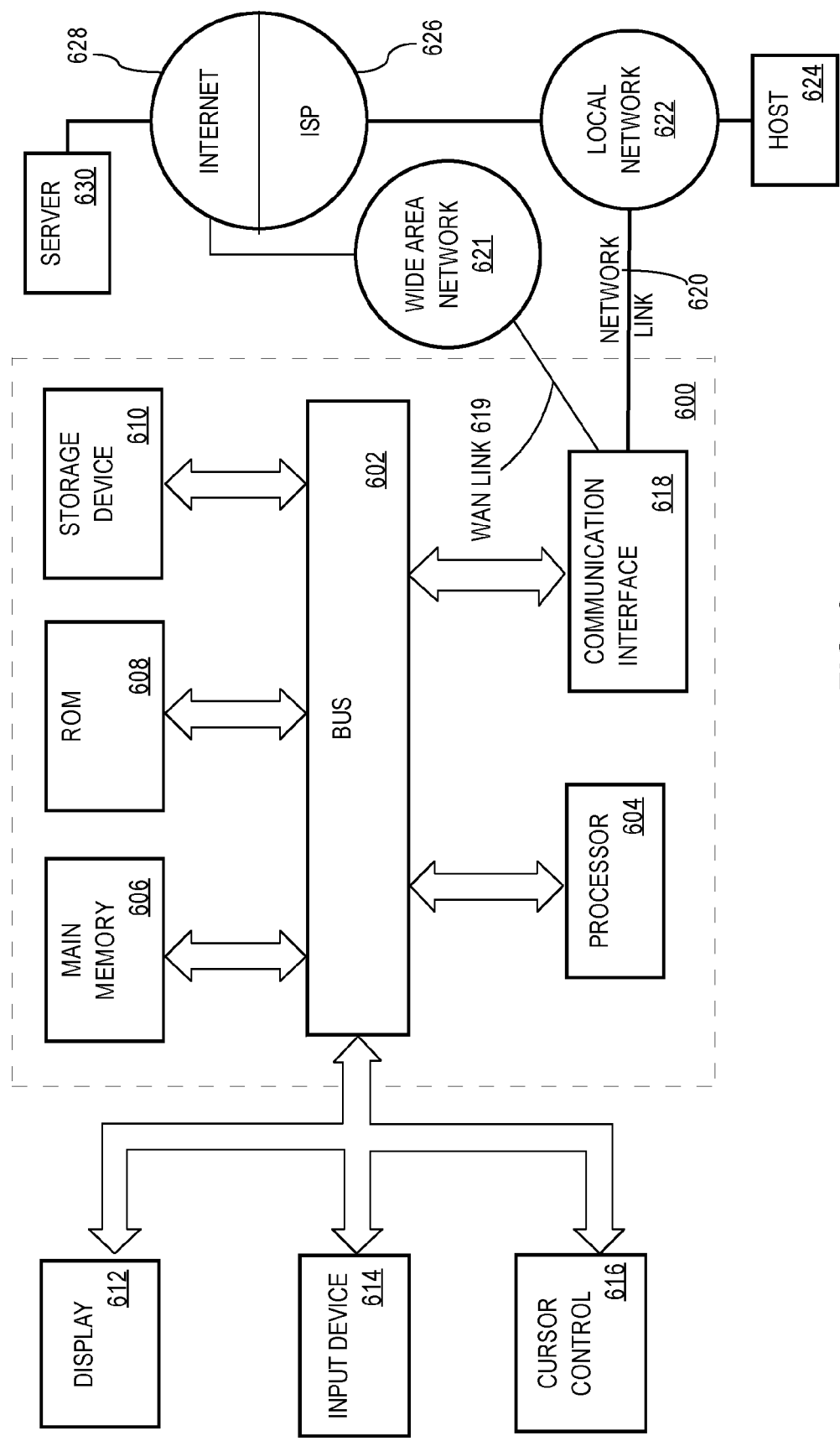
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor, a microprocessor and a co-processor, or an array of multiple microprocessors.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid-crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, touch pad, touch screen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Communication interface 618 may provide a two-way data communication coupling to a Wide Area Network (WAN) link 619 that is connected to a WAN 621. For example, communication interface 618 may be an integrated services digital network (ISDN) card, cable modem, satellite modem, or a modem to provide a data communication connection to a corresponding type of telephone line. As another example, communication interface 618 may be a wireless network card or modem to provide a data communication connection to a compatible Wide Area Network (WAN) 621 through WAN link 619. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   a memory;
   one or more processors coupled to the memory, and configured to:
   receive a first data set indicating that a first device and a second device are communicatively coupled over a first network for a first amount of time, wherein the first device is used by a first user and the second device is used by a second user;
   determine that the first device is within a first proximity to the second device based on the first data set indicating that the first device and the second device are communicatively coupled over the first network;
   determine a first type of relationship between the first user and the second user based on the first proximity and the first amount of time.

2. The computer system of claim 1, wherein the first network comprises two or more computing devices, which are at least the first device and the second device.

3. The computer system of claim 1, wherein the first network is at a particular physical location, and wherein the one or more processors are further configured to:
   receive a second data set indicating that a third device and a fourth device are communicatively coupled over a second network for a second amount of time, wherein the third device is used by a third user and the fourth device is used by a fourth user;
   determine that the third device is within a second proximity to the fourth device based on the second data set indicating that the third device and the fourth device are communicatively coupled over the second network;
   determine a second type of relationship between the third user and the fourth user based on the second proximity and the second amount of time, wherein the second type of relationship is different than the first type of relationship.

4. The computer system of claim 3, wherein the second network is at the particular physical location, and wherein the one or more processors are further configured to:

determine, based on the first type of relationship between the first user and the second user, that the particular physical location is a first social location;

determine, based on the second type of relationship between the third user and the fourth user, that the particular physical location is also a second social location that is different than the first social location.

5. The computer system of claim 4, wherein the first device and the third device are the same device and the first user and the third user are the same user.

6. The computer system of claim 3, wherein:

the second network is at the particular physical location;

the first data set indicates that the first device and the second device are communicatively coupled over the first network according to a first peer interaction;

the second data set indicates that the third device and the fourth device are communicatively coupled over the second network according to a second peer interaction:

the one or more processors are further configured to:

determine, based on the first data set indicating that the first device and the second device are communicatively coupled according to the first peer interaction, that the particular physical location is a first social location;

determine, based on the second data set indicating that the third device and the fourth device are communicatively coupled according to the second peer interaction, that the particular physical location is also a second social location that is different than the first social location.

7. The computer system of claim 1, wherein the first data set includes audio data from the first device, the first network is at a particular physical location, and wherein the one or more processors are further configured to determine the particular physical location is a particular social location based on the audio data from the first device.

8. The computer system of claim 1, wherein the first data set indicates that the first device and the second device have a particular peer interaction, and wherein determining the first type of relationship between the first user and the second user is further based on the particular peer interaction.

9. The computer system of claim 1, wherein the first data set indicates that the first device and the second device have a particular peer interaction, wherein the first network is at a particular physical location, and wherein the one or more processors are further configured to determine, based on the particular peer interaction, that the particular physical location is a particular social location from among a plurality of possible social locations.

10. The computer system of claim 1, wherein the one or more processors are further configured to determine that the first user is associated with a particular tag, and in response to determining that the first user is associated with the particular tag, associate the particular tag with the second user.

11. The computer system of claim 1, wherein the first device is associated with a first user profile that corresponds with the first user, wherein the second device is associated with a second user profile, and wherein the one or more processors are further configured to:

determine that the first user profile is associated with a first tag;

determine that the second user profile is associated with a second tag, wherein the second tag is different than the first tag, and a particular message is associated with the first tag;

associate the second tag with the first tag;

receive a second data set indicating a third device is communicatively coupled to the first device, wherein the third device is associated with a third user profile and the third user profile is associated with the second tag;

send the particular message to the third device in response to determining that:

the third device is within a particular proximity of the first device;

the third user profile is associated with the second tag; and the second tag is associated with the first tag.

12. The computer system of claim 11, wherein the one or more processors are configured to generate the particular message based on the second user profile.

13. The computer system of claim 11, wherein the one or more processors are configured to generate the particular message based on data entered by the second user.

14. A method comprising:

receiving a first data set indicating that a first device and a second device are communicatively coupled over a first network for a first amount of time, wherein the first device is used by a first user and the second device is used by a second user;

determining that the first device is within a first proximity to the second device based on the first data set indicating that the first device and the second device are communicatively coupled over the first network;

determining a first type of relationship between the first user and the second user based on the first proximity and the first amount of time;

wherein the method is performed by one or more processors.

15. The method of claim 14, wherein the first network comprises two or more computing devices, which are at least the first device and the second device.

16. The method of claim 14, wherein the first network is at a particular physical location, and wherein the method further comprising:

receiving a second data set indicating that a third device and a fourth device are communicatively coupled over a second network for a second amount of time, wherein the third device is used by a third user and the fourth device is used by a fourth user;

determining that the third device is within a second proximity to the fourth device based on the second data set indicating that the third device and the fourth device are communicatively coupled over the second network;

determining a second type of relationship between the third user and the fourth user based on the second proximity and the second amount of time, wherein the second type of relationship is different than the first type of relationship.

17. The method of claim 16, wherein the second network is at the particular physical location, and wherein the method further comprising:

determining, based on the first type of relationship between the first user and the second user, that the particular physical location is a first social location;

determining, based on the second type of relationship between the third user and the fourth user, that the particular physical location is also a second social location that is different than the first social location.

18. The method of claim 17, wherein the first device and the third device are the same device and the first user and the third user are the same user.

19. The method of claim 16, wherein:
the second network is at the particular physical location;
the first data set indicates that the first device and the second device are communicatively coupled over the first network according to a first peer interaction;
the second data set indicates that the third device and the fourth device are communicatively coupled over the second network according to a second peer interaction:
the method further comprising:
determining, based on the first data set indicating that the first device and the second device are communicatively coupled according to the first peer interaction, that the particular physical location is a first social location;
determining, based on the second data set indicating that the third device and the fourth device are communicatively coupled according to the second peer interaction, that the particular physical location is also a second social location that is different than the first social location.

20. The method of claim 14, wherein the first data set includes audio data from the first device, the first network is at a particular physical location, and wherein the method further comprising determining the particular physical location is a particular social location based on the audio data from the first device.

21. The method of claim 14, wherein the first data set indicates that the first device and the second device have a particular peer interaction, and wherein determining the first type of relationship between the first user and the second user is further based on the particular peer interaction.

22. The method of claim 14, wherein the first data set indicates that the first device and the second device have a particular peer interaction, wherein the first network is at a particular physical location, and wherein the method further comprising determining, based on the particular peer interaction, that the particular physical location is a particular social location from among a plurality of possible social locations.

23. The method of claim 14 further comprising determining that the first user is associated with a particular tag, and in response to determining that the first user is associated with the particular tag, associating the particular tag with the second user.

24. The method of claim 14, wherein the first device is associated with a first user profile that corresponds with the first user, and wherein the second device is associated with a second user profile, and wherein the method further comprising:
determining that the first user profile is associated with a first tag;
determining that the second user profile is associated with a second tag, wherein the second tag is different than the first tag, and a particular message is associated with the first tag;
associating the second tag with the first tag;
receiving a second data set indicating a third device is communicatively coupled to the first device, wherein the third device is associated with a third user profile and the third user profile is associated with the second tag;
sending the particular message to the third device in response to determining that:
the third device is within a particular proximity of the first device;
the third user profile is associated with the second tag; and
the second tag is associated with the first tag.

25. The method of claim 24, wherein the particular message is generated based on the second user profile.

26. The method of claim 24, wherein the particular message is generated based on data entered by the second user.

27. A device comprising:
a memory;
one or more processors coupled to the memory and configured to:
determine the device is operably coupled to a different device for a particular number of times over a particular period of time;
determine a type of relationship between a user of the device and a different user using the different device based on the particular number of times over the particular period of time.

28. The device of claim 27, wherein the one or more processors are further configured to:
determine that the device is operably coupled to the different device according to a particular protocol of a plurality of protocols;
determine that the particular protocol of the plurality of protocols is associated with a particular proximity of a plurality of proximities;
wherein determining that the type of relationship between the user of the device and the different user using the different device is also based the particular proximity.

29. The device of claim 27, wherein the one or more processors are further configured to:
determine that the device is at a particular geographic location;
determine that the particular geographic location is a particular social location, of a plurality of social locations, based on the type of relationship between the user of the device and the different user using the different device.

30. The device of claim 27, wherein the one or more processors are further configured to:
determine that the device is at a particular geographic location;
associate the particular geographic location is associated with a particular social location of a plurality of social locations;
wherein determining that the type of relationship between the user of the device and the different user using the different device is also based the particular social location associated with the particular geographic location.

* * * * *